(12) United States Patent
Lim

(10) Patent No.: US 6,404,754 B1
(45) Date of Patent: Jun. 11, 2002

(54) RADIO PACKET DATA TERMINAL AND METHOD OF DETERMINING INTERNET INTERWORKING PROTOCOL ADDRESS

(75) Inventor: Byung Keun Lim, Kyungki-do (KR)

(73) Assignee: LG Information & Communications, Ltd., Seoul (KR)

(*) Notice: Subject to any disclaimer, the term of this patent is extended or adjusted under 35 U.S.C. 154(b) by 0 days.

(21) Appl. No.: 09/224,053

(22) Filed: Dec. 31, 1998

(30) Foreign Application Priority Data

Sep. 7, 1998 (KR) .......................................... 98-37253

(51) Int. Cl.[7] ................................................ H04Q 7/24
(52) U.S. Cl. ................................... 370/338; 370/395.52
(58) Field of Search ................................ 370/338, 328, 370/349, 351, 352, 329, 310, 402, 401, 465, 466, 467, 469, 395.1, 395.52, 400; 455/433, 435, 436

(56) References Cited

U.S. PATENT DOCUMENTS

| | | | | |
|---|---|---|---|---|
| 5,911,120 A | * | 6/1999 | Jarett et al. .................. | 455/417 |
| 6,134,446 A | * | 10/2000 | Sasuta et al. ................. | 455/456 |
| 6,137,783 A | * | 10/2000 | Sallberg ....................... | 370/316 |
| 6,137,791 A | * | 10/2000 | Frid et al. .................... | 370/352 |
| 6,167,280 A | * | 12/2000 | Barrett et al. ................. | 455/466 |
| 6,223,035 B1 | * | 4/2001 | Pierce et al. ................. | 455/433 |
| 6,272,338 B1 | * | 8/2001 | Modzelesky et al. ......... | 455/426 |

* cited by examiner

*Primary Examiner*—Dang Ton
*Assistant Examiner*—Brian Nguyen
(74) *Attorney, Agent, or Firm*—Fleshner & Kim, LLP (57) ABSTRACT

A radio packet data terminal and a method of determining an Internet interworking protocol address which can easily provide a mobile Internet protocol service and a mobile Internet service by adding a packet data service option and an Internet protocol address option to an originating message to be transmitted to a base transceiver station or by adding information on the system address for interworking packet data to be connected, the present state of the packet data connection, the purpose of the packet data service connection, etc., to the originating message, when the radio packet data service for connecting with Internet is requested. According to the radio packet data terminal, a simple interworking protocol (SIP) option if the mobile terminal does not have a fixed IP address, a mobile interworking protocol (MIP) option is determined if the mobile terminal has the fixed IP address or is connected to a personal computer (PC), and a unique interworking protocol (UIP) option is determined if the mobile terminal is permanently provided with an Internet interworking protocol. Accordingly, the radio packet data terminal provides an Internet protocol option, connection address option, and state option of the packet data link when the packet data service is requested.

18 Claims, 10 Drawing Sheets

RADIO PACKET DATA TERMINAL AND METHOD OF DETERMINING INTERNET INTERWORKING PROTOCOL ADDRESS

BACKGROUND OF THE INVENTION

1. Field of the Invention

The present invention relates generally to a mobile data service. In particular, the present invention relates to a radio packet data terminal and a method of determining an Internet interworking protocol address which use added options according to the existence/nonexistence of an Internet packet data terminal identifier of the terminal when a packet data service is requested for an Internet connection under the support of a radio packet data service network structure and a packet data communication protocol.

2. Description of the Related Art

According to the mobile data service recently proposed, an interworking function device (IWF) having a switching function in accordance with a service option set in a mobile terminal is connected to a mobile switching center (MSC), and protocol stacks for other circuit data and packet data are additionally connected to respective network elements of the existing mobile telephone network, so that a circuit data service and packet data service such as asynchronous data and 3G facsimile data can be provided.

Figure 1:
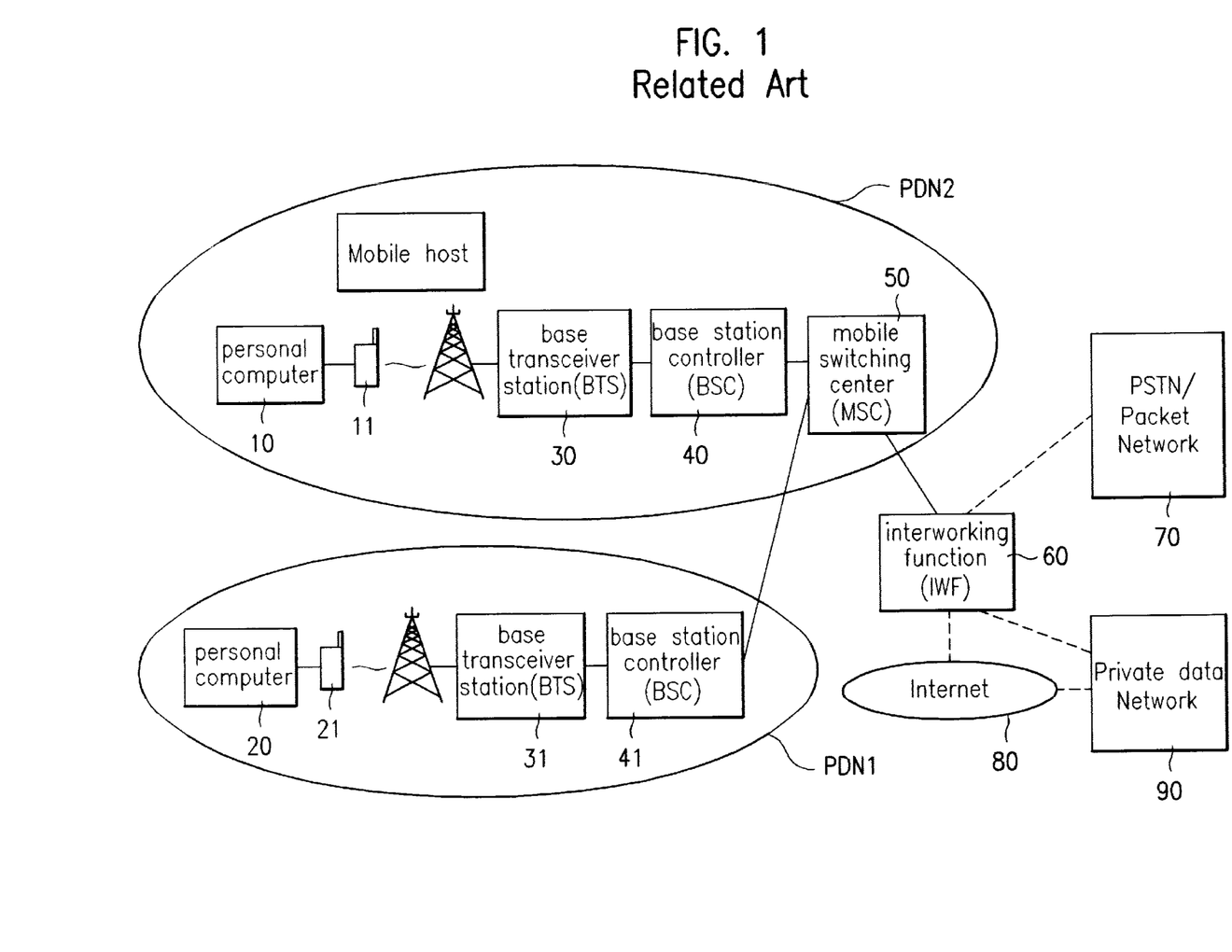
FIG. 1 is a schematic block diagram illustrating the structure of a conventional radio data service network.

FIG. 1 is a schematic block diagram illustrating the structure of a conventional radio data service network.

Referring to FIG. 1, the conventional radio data service network is basically provided with a mobile switching center (MSC) 50 for connecting a call to an interworking function device (IWF) 60 if a mobile subscriber requests a mobile data service in a mobile communication network, and the interworking function device (IWF) 60 for determining a mobile data path by identifying the existence/nonexistence of idle resources after allocating an effective channel of a trunk for data communication, and supporting the data communication between the subscribers. Here, PDN1 and PDN2 are two divided sections of the radio PCS data network.

According to the conventional radio data service, if the radio packet data service or circuit data service is requested from a personal computer 10 or 20 connected to a mobile terminal 11 or 21 to Internet, the mobile terminal 11 or 21 requests a packet call to the mobile switching center 50 with the addition of a service option for the corresponding service.

The packet call of the mobile terminal 11 or 21 is transferred to the mobile switching center 50 through a base transceiver station 30 or 31 and a base station controller 40 or 41. At this time, if the mobile switching center 50 identifies the data service requested by the mobile terminal 11 or 21 and requests a call connection to the interworking function device 60, the interworking function device 60 optionally connects the present call of the mobile terminal 11 or 21 to a public switched telephone network (PSTN)/packet network 70.

As described above, if the mobile terminal 11 or 21 requests the data service only with the addition of the radio data service option in the mobile communication system, the interworking function device 60 determines the data communication path according to the present location of the radio data terminal so that the radio data terminal connects with the radio data service network.

Since the communication path between the mobile terminal and the interworking function device is determined in accordance with the present location of the mobile terminal, if the mobile terminal moves into an area served by a new interworking function device and a handoff is generated during the packet data service, the re-registration procedure for disconnecting the mobile terminal from the previous interworking function device and connecting the mobile terminal to the new interworking function device is required.

As described above, since the conventional mobile terminal for radio data communication is connected to the interworking function device in accordance with the present location of the mobile terminal when the packet data service is requested, if a handoff is generated during the registration of a mobile Internet protocol service, the Internet interworking protocol address should be re-registered. Also, the mobile terminal cannot be directly connected to a specified interworking function device in accordance with the request of the Internet service provider or the Internet user.

SUMMARY OF THE INVENTION

Accordingly, the present invention is directed to a radio packet data terminal and a method of determining an Internet interworking protocol address that substantially obviate one or more of the problems due to limitations and disadvantages of the related art.

An object of the present invention is to provide a radio packet data terminal and a method of determining an Internet interworking protocol address which can easily provide a mobile Internet protocol service and a mobile Internet service by adding a packet data service option and an Internet protocol address option to an originating message to be transmitted to a base transceiver station or by adding information on the system address for interworking packet data to be connected, the present state of the packet data connection, the purpose of the packet data service connection, etc., to the originating message, when the radio packet data service for connecting with Internet is requested.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the radio packet data terminal comprises a first mobile terminal determined by a simple interworking protocol (SIP) option for providing a mobile data service only to a network interworking protocol (IP) after connecting with Internet if the radio packet data terminal does not have a fixed IP address, a second mobile terminal determined by a mobile interworking protocol (MIP) option for providing the mobile data service to a radio LAN port including a home agent and a foreign agent if the radio packet data_terminal has the fixed IP address or is connected to a personal computer (PC), and a third mobile terminal determined by a unique interworking protocol (UIP) option for providing the mobile data service to its own interworking function device if the radio packet data terminal is permanently provided with an Internet interworking protocol.

In another aspect of the present invention, there is provided a method of determining an Internet interworking protocol address comprising the steps of transmitting mobile station packet calls from a mobile terminal to a radio network controller and registering as a packet data service option of the mobile terminal one of a simple interworking protocol (SIP) option, a mobile interworking protocol (MIP) option, and a unique interworking protocol (UIP) option in accordance with a response to the transmitted mobile station packet calls, determining a point-to-point (PPP) link by calling data service packets in accordance with the IP option registered in the mobile station after the registration of the packet data service option and releasing a packet channel of the mobile station if a term of a PPP link timer of a radio network controller expires and a present state is a dormant-open state, and re-determining the open PPP link by transmitting again the mobile station packet calls to a new radio network controller and transmitting an upper layer data on a virtual network pipeline (VNP) if a handoff is generated between the mobile station and the new radio network controller in the dormant-open state of the PPP link.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Reference will now be made in detail to the preferred embodiment of the present invention, examples of which are illustrated in the accompanying drawings.

Figure 2:
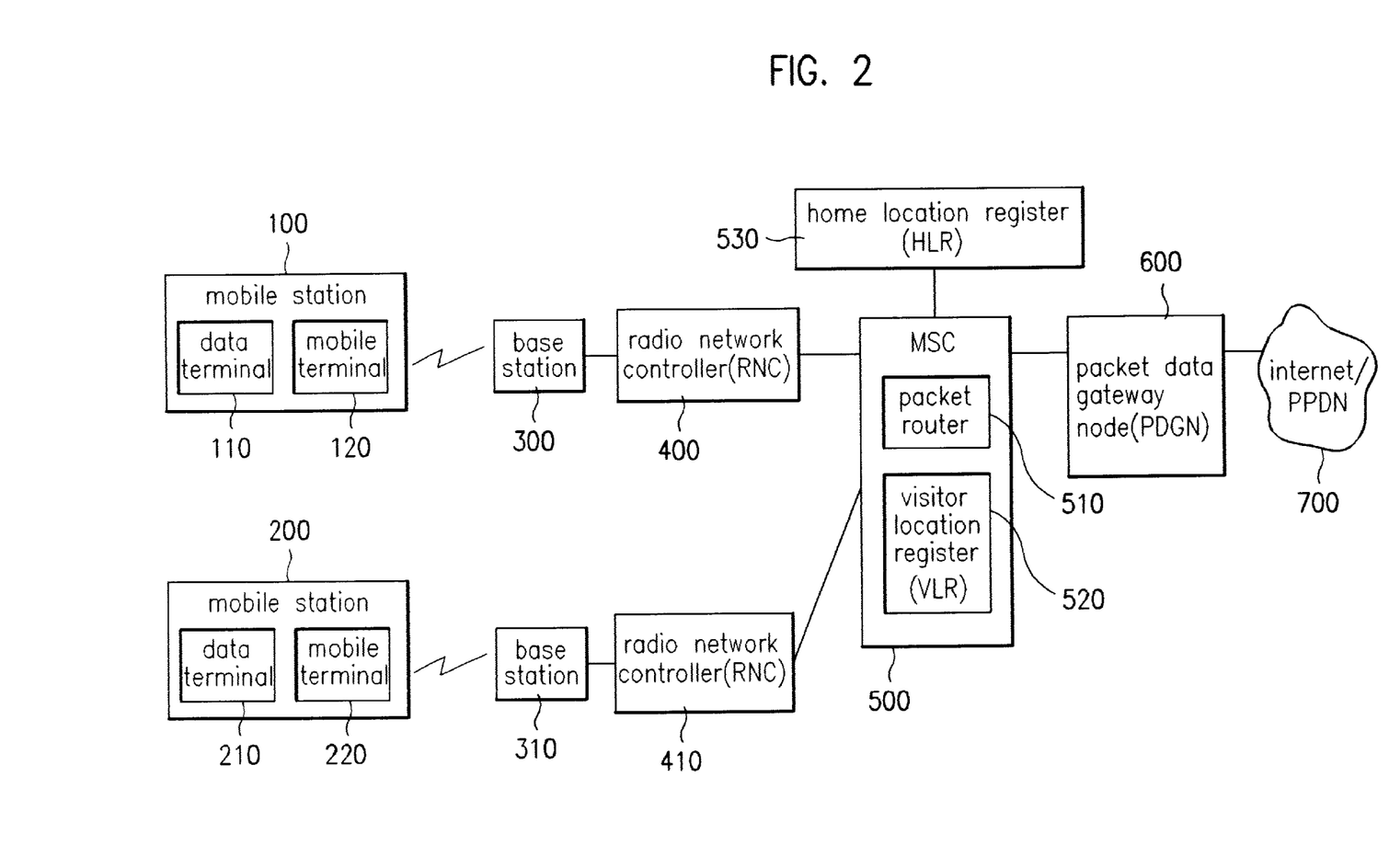
FIG. 2 is a schematic block diagram illustrating the structure of the next-generation packet data service network according to the present invention.

FIG. 2 is a schematic block diagram illustrating the structure of the next-generation packet data service network according to the present invention.

Referring to FIG. 2, according to the radio packet data terminal according to the present invention, the mobile station 100 or 200 is composed of a mobile terminal 120 or 220 for controlling the calling of the radio data and the mobility of the terminal, and a data terminal 110 or 210, connected to the mobile terminal 120 or 220, for the radio data communication.

The mobile station 100 or 200, when it connects with an Internet/public packet data network (PPDN) 700 by a packet data or circuit data service option, installs a point-to-point serial communication protocol in a packet data gateway node (PDGN) 600 to transmit network layer protocol data between the mobile station and the Internet/PPDN 700.

Also, the radio packet data service network according to the present invention includes a base station 300 or 310 for connecting a radio channel to the mobile station 100 or 200, and a radio network controller (RNC) 400 or 410 for controlling the radio channel allocation to the mobile station 100 or 200, the management of radio resources, and the channel allocation according to a service option of the mobile station 100 or 200, for performing the separation of the packet data and circuit data service paths, and for serving as a node of the terminal in the packet data network for the packet data service when it matches a core network. The RNC 400 or 410 is provided with terminal node identifiers for the respective network elements for the next-generation packet data service.

The mobile switching center (MSC) 500 stores therein the numbers of packet data terminal identifier (PDTI) and international mobile station identifier (IMSI) of the mobile station 100 or 200 registered in its own coverage area. If the mobile station 100 or 200 has a mobile Internet protocol (MIP) or an unique internet protocol (UIP), the mobile switching center 500 manages a foreign agent of the corresponding Internet protocol or a terminal node identifier. The mobile switching center 500 includes a home location register (HLR) 530 for managing the currently registered location information.

The mobile switching center 500 also includes a visitor location register (VLR) 520 which stores therein the numbers of PDTI and IMSI of the mobile station 100 or 200 registered in its own area, and manages the corresponding Internet protocol, if it has the MIP or UIP, and information on the PDGN 600 of the foreign agent and on the PDGN 600 of the home agent, and a packet router 510 for transferring the packet data between the RNC 400 or 410 and the PDGN 600 and packet signal processing data between terminal nodes.

Accordingly, if the RNC 400 or 410 and the PDGN 600 request the location registration information of the mobile station 100 or 200, the mobile switching center 500 provides a path of the location registration information of the mobile station 100 or 200 through the HLR 530 and the VLR 520, exchanges the circuit data, manages the registration of the terminal node identifiers of the packet data network of the RNC 400 or 410 and the PDGN 600 connected thereto, and gives to the PDGN 600 the IMSI number which the user can directly call.

The PDGN 600 according to the present invention defines boundaries among the radio packet data service network, the mobile packet data network, and the public Internet/PPDN. The PDGN 600 is a terminal of the radio data link protocol which performs the function of the point-to-point server, the foreign agent (FA) for the mobile Internet protocol, and the home agent (HA) for the UIP. Also, the PDGN 600 operates as the terminal node of the packet data network, and has the numbers of the unique terminal node identifier and international mobile identifier (IMSI) as a network identifier.

The PDGN 600 performs the function of the home agent (HA) when it registers the MIP on the mobile Internet to receive the MIP service or when a terminal of the UIP option of another radio network which is not connected to the HA via MSC and radio network requests the MIP service. Also, the PDGN 600, which serves as a home gateway router, performs the home agent (HA) function for the MIP service when the point-to-point link data of the UIP mobile station has moved to another network which is not connected to the packet data network.

The mobile terminal 120 or 220, which is a packet data terminal among the network elements of the next-generation radio packet data service, provides the following connection service under the support of the network elements constructed as above and the data communication protocol.

First, the mobile terminal 120 or 220 selects the packet service option, and performs the packet network connection function for connecting to the host server in the corresponding data network by calling the Internet/PPDN 700 as the packet data terminal.

The mobile terminal 120 or 220 also operates as the Internet server/host, and provides an applied service by responding to the call from a client connected to the Internet.

The mobile terminal 120 or 220 also perform the connection service function required for the packet data communication between the mobile stations by using the IMSI number of the mobile station 100 or 200 or by calling the packet data terminal identifier allocated to the mobile station 100 or 200.

Accordingly, the mobile terminal 120 or 220 classifies the packet data service option into the simple Internet protocol (SIP) option, the MIP option, and the UIP option in accordance with the existence/nonexistence of the packet data terminal identifier which the mobile terminal possesses, and classifies the service call option into a default access option and a designated access option.

Also, the mobile terminal 120 or 220 operates in an active open state, in a dormant open state, or in a close state in accordance with the connection state of the packet data link, and requests the packet data service to the mobile switching center 500 with the addition of the previous mobile station state option by identifying whether the packet service connection request is a new call connection request or the pre-installed packet service if in a temporarily idle state when the packet service connection is requested.

The Internet protocol option classifies the mobile terminal 120 or 220 as the terminal of the UIP option if the Internet protocol address is its own address given from the mobile data service network, classifies the mobile terminal as the terminal of the MIP option if the Internet protocol address being used in the wired data network is the address temporarily used for receiving the MIP service, and classifies the mobile terminal as the terminal of the SIP option if the mobile terminal 120 or 220 does not have its own Internet protocol address.

As described above, the mobile terminal 120 or 220 determines the packet data gateway node for connecting with the default address when the packet data service is connected according to the Internet protocol option, and always adds to the packet data the Internet protocol option and the connection option when the packet data service is connected.

Specifically, if the mobile terminal transmits the message of the packet data service request to the base station 300 or 310 by using the three added options, the base station 300 or 310 and the mobile switching center 500 discriminate the connection number option, which is the service option, and the state option of the packet data link, and designate the radio data link path between the mobile terminal 120 and 220 and the base station, so that the mobile terminal 120 or 220 can receive the radio packet data service even during the MIP service and the handoff of the mobile terminal.

If the Internet connection packet service is requested in case that the data terminal 110 or 210 does not have the mobile Internet protocol address or the UIP address allocated fixedly during the SIP option, the PDGN 600 allocates the Internet protocol address which belongs to a lower network identifier of the PDGN 600 so that the Internet protocol address can be used during the point-to-point link is maintained after the point-to-point link is connected.

When the terminal requests the packet data service connection during the SIP option as described above, the RNC 400 or 410 requests to the mobile switching center 500 the terminal node identifier address of the PDGN 600 to be connected thereto, and the mobile switching center 500 responds to the address of the PDGN 600 which is nearest to the RNC 400 or 410 among the PDGNs connected to its own network, and determines the packet data link between the RNC 400 or 410 and the PDGN 600 for transferring the point-to-point frame data between the terminal of the SIP option and the PDGN 600, so that the point-to-point link is connected between the mobile station 100 or 200 and the PDGN 600.

During the MIP option, the Internet protocol used between the terminal and the Internet fixed by wire is used in the data terminal 110 or 210.

Specifically, if the mobile station 100 or 200 requests the packet call connection, the RNC 400 or 410 requests to the mobile switching center 500 the terminal node identifier of the PDGN 600 which will transmit the point-to-point frame data. At this time, the mobile switching center 500 replies to the RNC the mutual packet network identifier of the PDGN 600 for performing the foreign agent service registered by the MIP. That is, if it is assumed that during the MIP option, the power of the terminal is on, and the MIP is once re-registered after the MIP registration time elapses, the packet connection service for the registration is performed in such a manner that the packet call is connected to the PDGN 600 by the SIP option, and then the MIP is registered in the PDGN 600. If the MIP registration is completed, the PDGN 600 informs the mobile switching center 500 that the mobile terminal 120 or 220 of the corresponding MIP option is registered therein.

During the UIP option, the Internet protocol address allocated to the data terminal 110 or 210 or to the mobile terminal 120 or 220 is the host identifier in the Internet lower network identifier of the PDGN 600. In this case, the HLR 530 manages the Internet protocol combined with the IMSI with respect to the terminal of the UIP option, and manages the terminal node identifier of the PDGN 600 corresponding to the home network gateway of the Internet protocol.

At this time, if the packet connection service is requested by the UIP option, the RNC 400 or 410 requests to the mobile switching center 500 the terminal node identifier of the PDGN 600 corresponding to the home gateway router of the UIP option terminal, and if the mobile switching center 500 responds to this request, it determines the packet data link between the RNC 400 or 410 and the PDGN 600 for transferring the point-to-point frame data between the terminal of the UIP option and the PDGN 600, so that the point-to-point link is connected between the mobile station 100 or 200 and the PDGN 600.

Also, if the call is requested without giving any specified number during the packet service call, the terminal classifies the service call option as the default packet connection service option, and thus connects the call by designating a packet data interworking system. If the call is requested with the designation of the number of a specified mobile station, the terminal classifies the service call option as the designated packet connection service option.

The call process using the next-generation packet data network according to the present invention will now be explained with reference to FIGS. 3a to 3d.

Figure 3A:
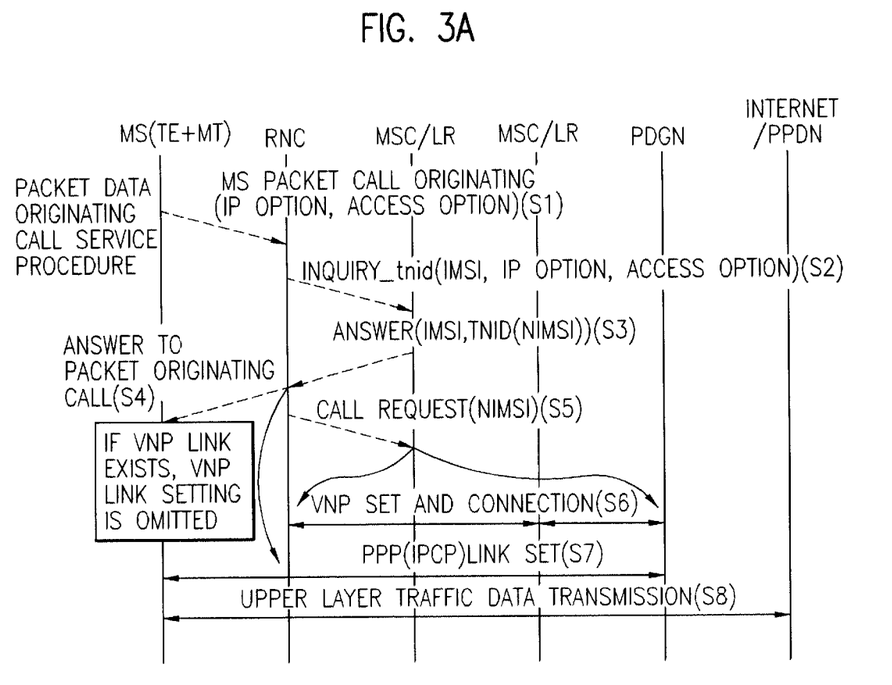
FIGS. 3a to 3d are flowcharts illustrating the next-generation packet data transmission procedures according to the present invention.

As shown in FIG. 3a, according to the packet data originating call service procedure, the mobile station transmits the packet data call to the RNC 400 or 410 using the IP option and the access option (S1). Thereafter, the RNC 400 or 410 inquires of the mobile switching center about the location information of the PDGN using the mobile station identifier, IP option, and access option (S2). The mobile switching center answers the RNC the result of identifying the location information (S3). Then, the mobile switching center controls to install the virtual network pipeline (VNP) between the RNC 400 or 410 and the PDGN 600 (S6). At this time, the installation of a new VNP is not performed if the VNP has already been set. Thereafter, the PPP link is set between the mobile station and the PDGN (S7), and the upper layer traffic data is mutually transmitted (S8).

Figure 3B:
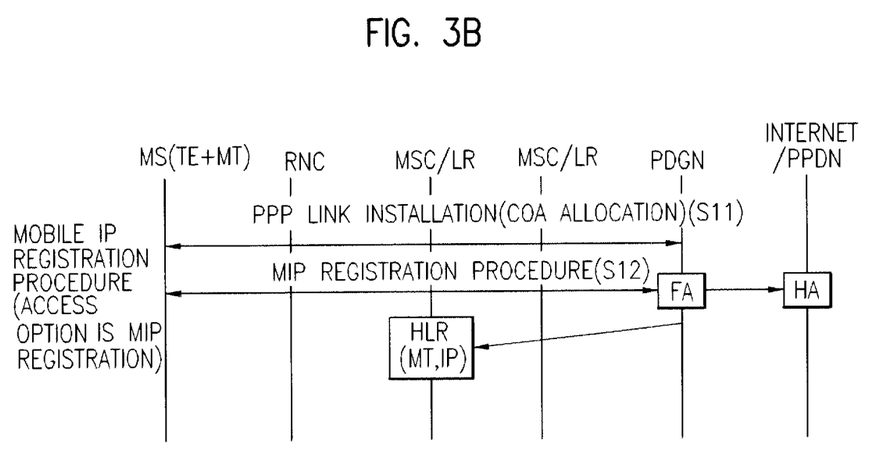

Referring to FIG. 3b, the mobile IP registration procedure is performed in such a manner that if the mobile station 100 or 200 provided with the Internet/PPDN 700 as its home agent uses an external agent in a state that the PPP link is installed, it informs this fact to the home location register (HLR) to perform the registration procedure of the mobile IP.

Figure 3C:
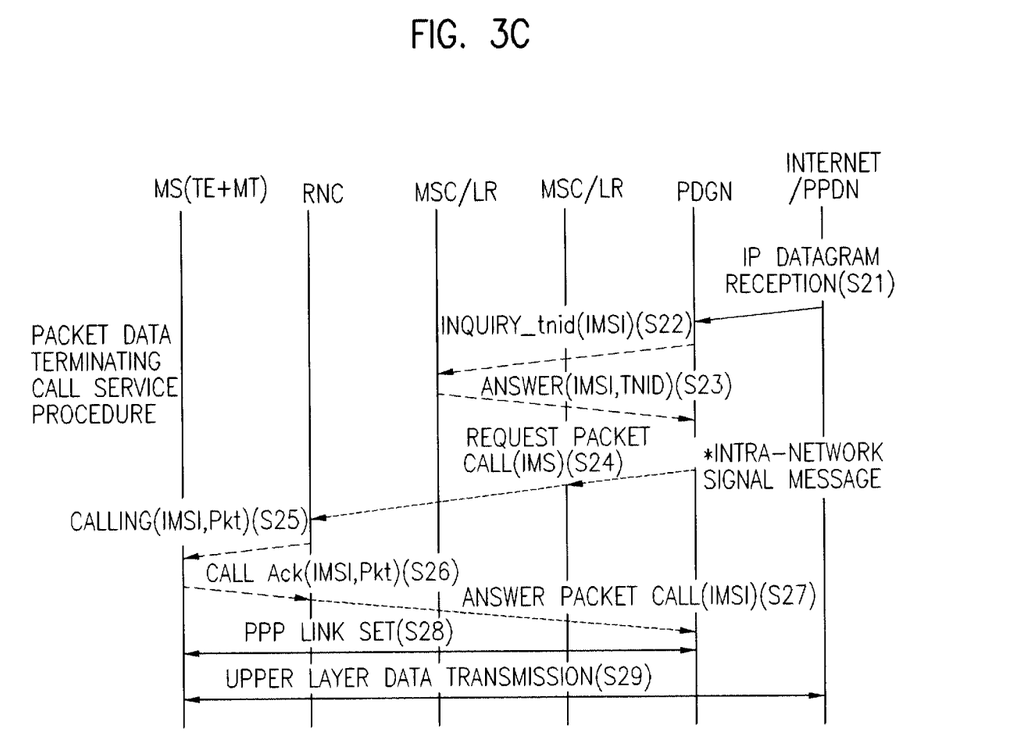

As shown in FIG. 3c, according to the packet data terminating call service procedure, the PDGN 600 receives an IP datagram from the Internet/PPDN 700 (S21). Thereafter, the PDGN 600 inquires of the mobile switching center 500 about the location information of the RNC 400 or 410 using the mobile station identifier (IMSI) or an address (S22). The mobile switching center 500 answers the PDGN 600 the result of identifying the location information using the mobile station identifier and the terminal node identifier (S23). Then, the mobile switching center 500 calls the corresponding mobile station by originating the packet data call to the RNC (S24), and if the call to the mobile station is answered, it informs the PDGN 600 of the terminal node identifier of the RNC 400 or 410 which received the call answer from the mobile station (S27). Thereafter, the PPP link is set between the mobile station 100 or 200 and the PDGN 600 (S28), and the upper layer packet data is transmitted (S29).

Figure 3D:
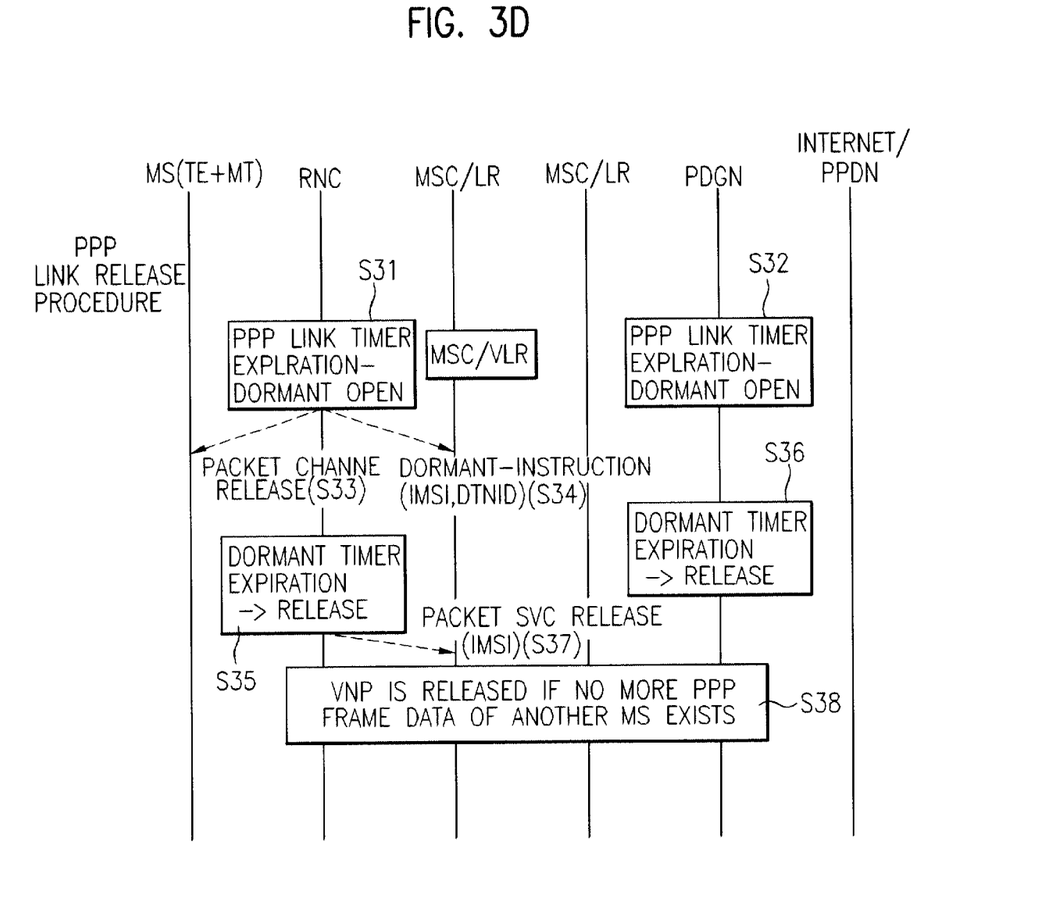

The release of the PPP link set as shown in FIGS. 3a and 3c is performed by the procedure as shown in FIG. 3d. If the PPP frame data is not transmitted, the RNC 400 or 410 or PDGN 600 drives a PPP link timer (S31 and S32). Thereafter, if the term set by the PPP link timer expires, the RNC 400 or PDGN 600 instructs to change the present active state to a dormant-open state (S32). If the PPP frame data is not transmitted in the dormant-open state, the RNC 400 or PDGN 600 drives a dormant timer (S35 and S26). If the term set by the dormant timer expires, the RNC 400 informs the mobile switching center 500 to release a switching virtual circuit (SVC) (S37). Accordingly, no more PPP frame data of another mobile station exists, and thus the virtual network pipeline (VNP) is released.

The operation of the packet data network according to the present invention when a handoff is generated will now be explained with reference to FIGS. 4a to 4e.

Figure 4A:
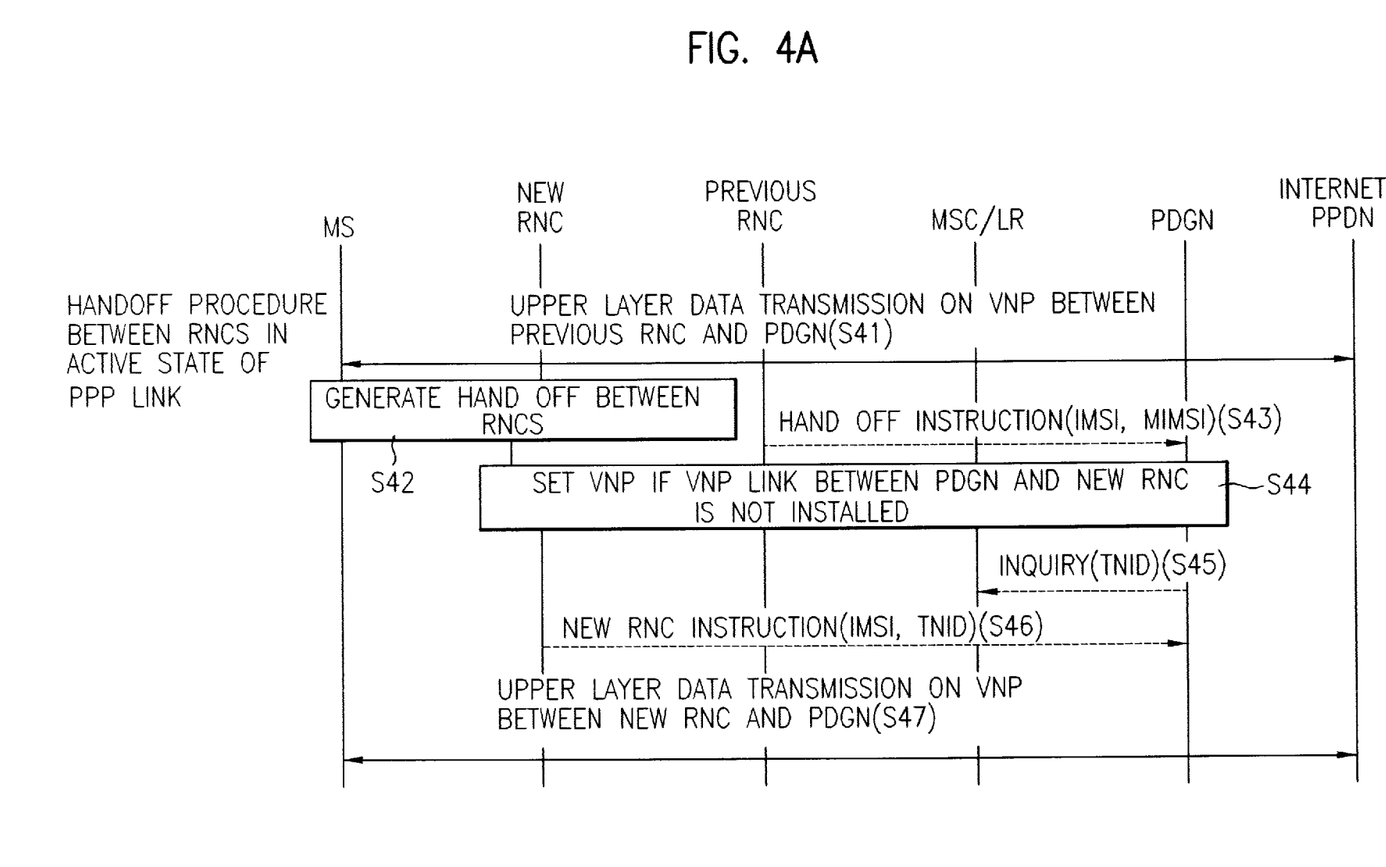
FIGS. 4a to 4e are flowcharts illustrating the handoff procedures in various states of the next-generation packet data transmission according to the present invention.

First, referring to FIG. 4a, if the PPP link set between the mobile station 100 or 200 and the PDGN 600 is in the active state, i.e., if a certain mobile station 100 or 200 moves into the region of a new RNC and a handoff is generated (S42) in a state that the upper layer data is transmitted using the virtual network pipeline (S41), the present RNC instructs the PDGN 600 a handoff utilizing the network identification addresses IMSI and MIMSI of the previous RNC (S43). At this time, if the virtual network pipeline is not installed between the PDGN 600 and the new RNC, a new virtual network pipeline is newly installed (S44).

Also, the PDGN 600 selectively inquires of the mobile switching center 500 about the terminal node identifier TNID of the new RNC. If the inquiry about the new RNC is answered, the new RNC informs the PDGN 600 of the network identification address IMSI of the new RNC and the terminal node identifier TNID (S46). Accordingly, the upper layer packet data is transmitted using the virtual network pipe line between the new RNC and the PDGN 600 (S47).

Second, the operation of the packet data network, if a certain mobile station 100 or 200 moves into the region of the mobile switching center 500 in a state that the PPP link set between the mobile station 100 or 200 and the PDGN 600 is in the active state, is similar to that in the state that the PPP link set between the mobile station 100 or 200 and the PDGN 600 is in the active state as shown in FIG. 4a. That is, the previous RNC instructs the PDGN 600 a handoff utilizing the network identification addresses. The PDGN 600 inquires of the mobile switching center 500 about the terminal node identifier of the new mobile switching center 500. If the inquiry is answered, the mobile switching center 500 informs the PDGN 600 of the network identification addresses of the new mobile switching center and the terminal node identifier. Accordingly, the packet data is transmitted using the virtual network pipeline between the new mobile switching center and the PDGN 600.

Figure 4B:
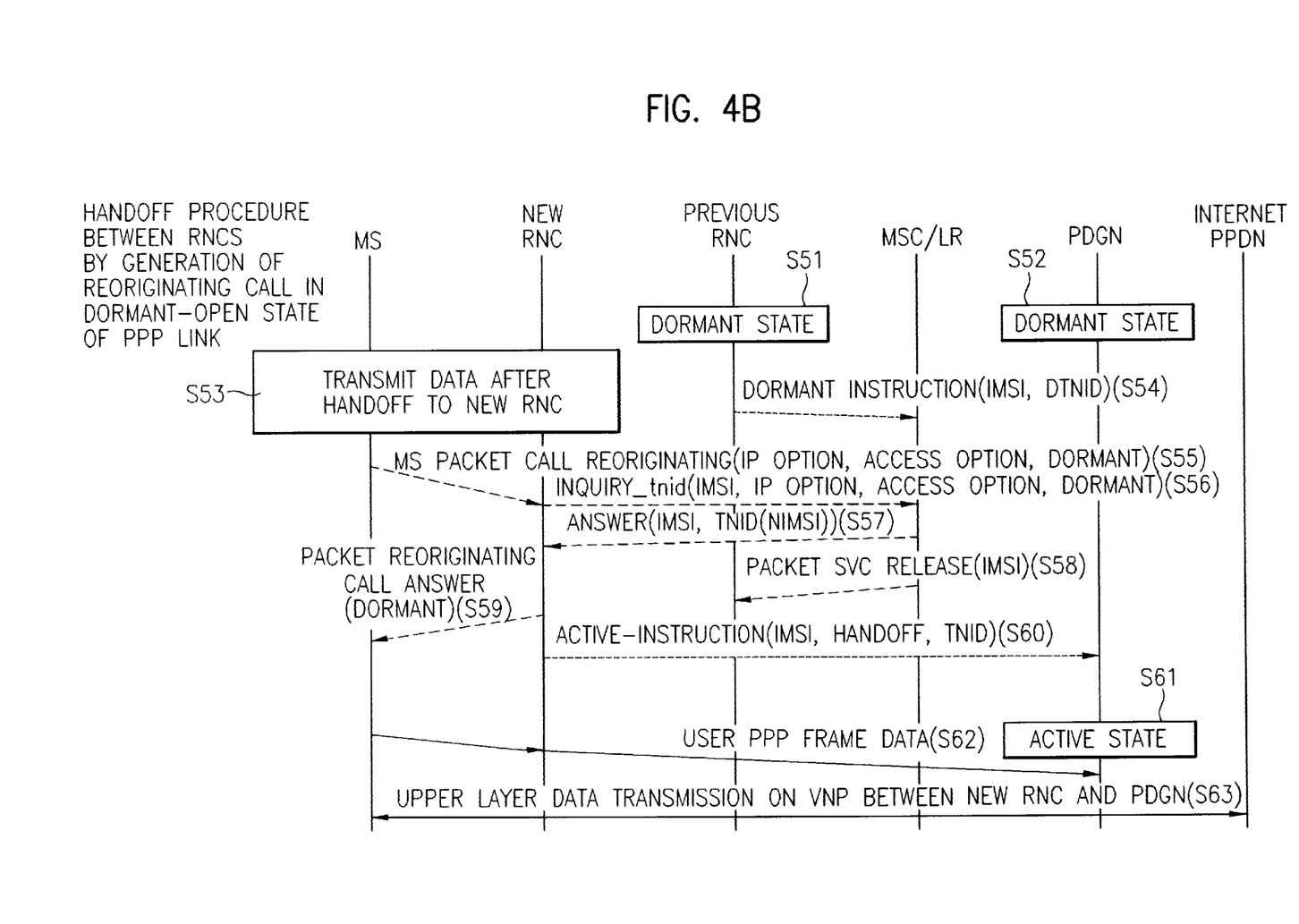

Third, as shown in FIG. 4b, in a state that the RNC 400 or 410 and the PDGN 600 are in a dormant-open state, respectively (S51 and S52), the previous RNC instructs the mobile switching center 500 of the dormant-open state utilizing the dormant mobile station identifier and the terminal node identifier IMSI and DTNID (S54). At this time, if a certain mobile station, after moving into the new RNC, transmits a re-originating call to the new RNC utilizing the IP option, access option, and dormant state information (S55), the mobile station should transmit the packet data after it sets a traffic channel with the new RNC (S53). Accordingly, the new RNC inquires of the mobile switching center 500 about the terminating terminal node identifier of the PDGN 600 utilizing the IP option, access option, and dormant state information (S56), and identifies the terminating terminal node identifier (S57).

Also, the mobile switching center 500 requests the previous RNC to release the packet SVC (S58). Accordingly, the new RNC transmits to the mobile station an answer signal for permitting the packet data transmission (S59), and instructs the PDGN 600 to change the present state to the active state utilizing the mobile station identifier IMSI, terminal node identifier TNID, and handoff information (S60). Accordingly, the PDGN 600 becomes active (S61), the PPP link is set between the mobile station 100 or 200 and the PDGN 600, and thus the PPP frame data is transmitted (S62). The originating mobile station transmits the upper layer packet data to the PDGN 600 using the virtual network pipeline (S63).

Figure 4C:
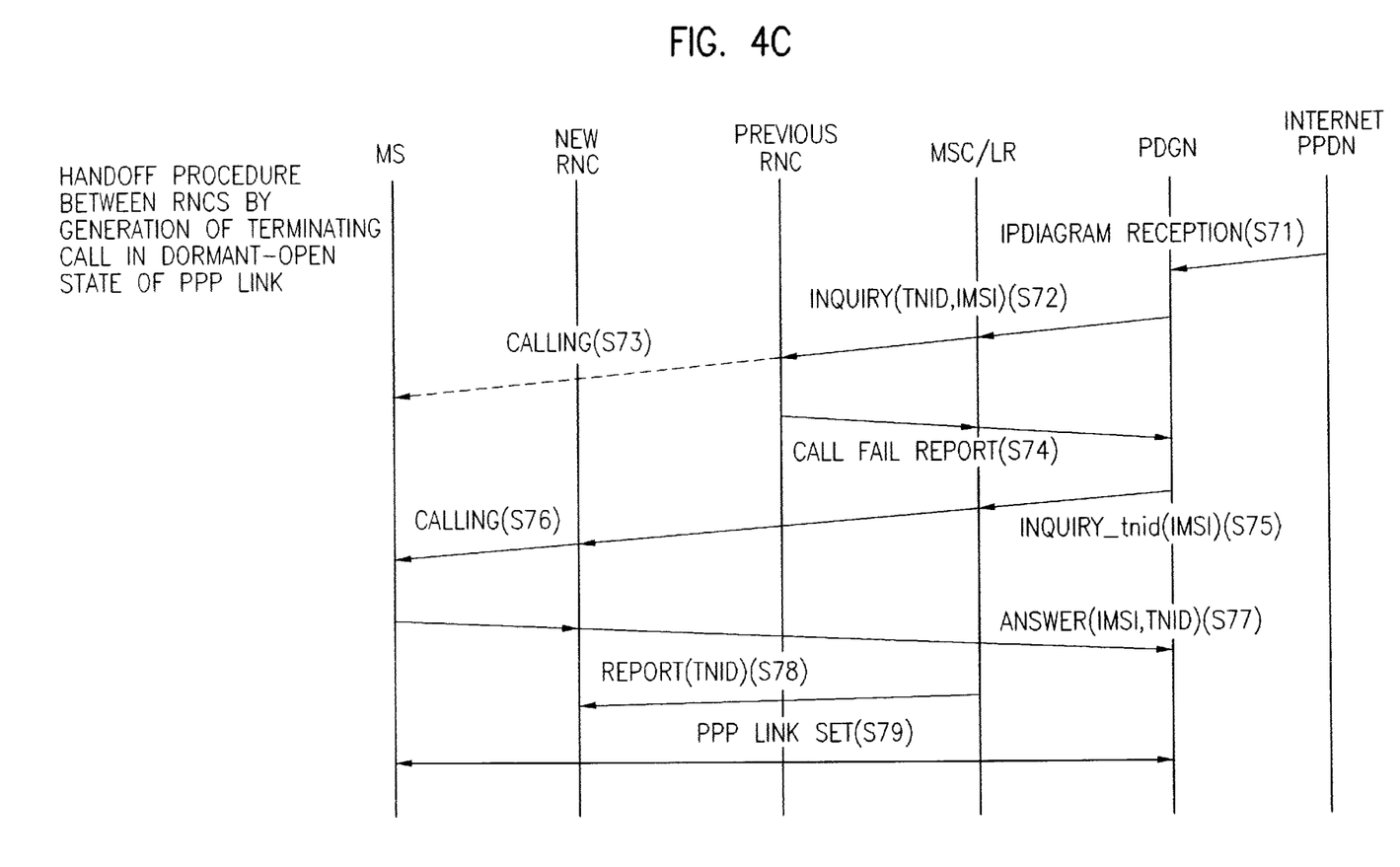

Fourth, as shown in FIG. 4c, if the IP diagram is received to the PDGN 600 in a state that the PPP link set between the mobile station 100 or 200 and the PDGN 600 is in the dormant-open state, and a certain mobile station has moved into a new RNC (S71), the PDGN 600 inquires of the previous RNC through the mobile switching center 500 about the moving IP, mobile station 100 or 200 identifier IMSI, and terminal node identifier TNID of the terminating mobile station (S72), and the previous RNC calls the mobile station (S73). If the previous RNC reports the call failure of the mobile station to the PDGN 600 through the previous mobile switching center (S74), the PDGN 600 inquires of the previous mobile switching center about the terminal node identifier of the new RNC (S75). Accordingly, the new RNC calls the terminating mobile station (S77), and the terminating mobile station informs the PDGN 600 of an answer message through the new RNC and mobile switching center (S77). Also, the mobile switching center 500 reports the terminal node identifier TNID of the PDGN 600 to the new RNC (S78). Accordingly, the PPP link is set between the PDGN 600 and the terminating mobile station using the virtual network pipeline (VNP), and thus the upper layer packet data can be transmitted (S79).

Figure 4D:
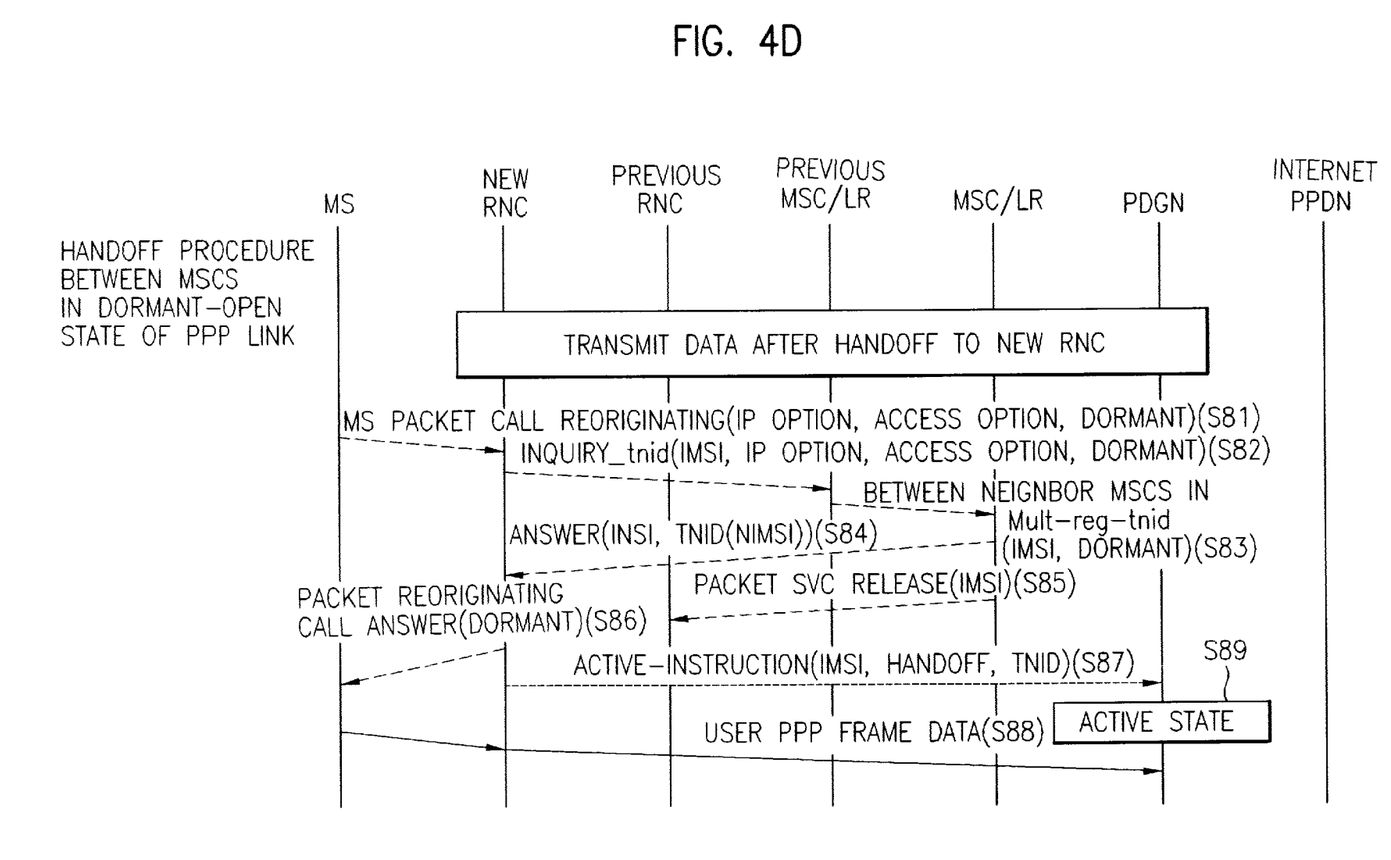

Fifth, as shown in FIG. 4d, if the mobile station 100 or 200 transmits are-originating call to a new RNC in a state that the PPP link set between the mobile station 100 or 200 and the PDGN 600 is in the dormant-open state, and a certain mobile station has moved into a new mobile switching center (S81), the new RNC requests the terminal node identifier of the PDGN 600 to the new mobile switching center utilizing the IP option, access option, and dormant state information (S82). The new mobile switching center transfers the request of the new RNC to the previous mobile switching center (S83). Accordingly, the previous mobile switching center answers the new RNC that its present state is the dormant-open state, and requests the previous RNC to release the packet SVC (S84 and S85). Thereafter, the new RNC answers the packet re-originating request of the mobile station (MS) (S86), and the previous RNC instructs the new RNC to change the present state to the active state (S87). Accordingly, the PDGN 600 becomes active (S89), the PPP link is set between the terminating mobile station and the PDGN 600, and thus the PPP frame data is transmitted through the virtual network pipeline (S88).

Figure 4E:
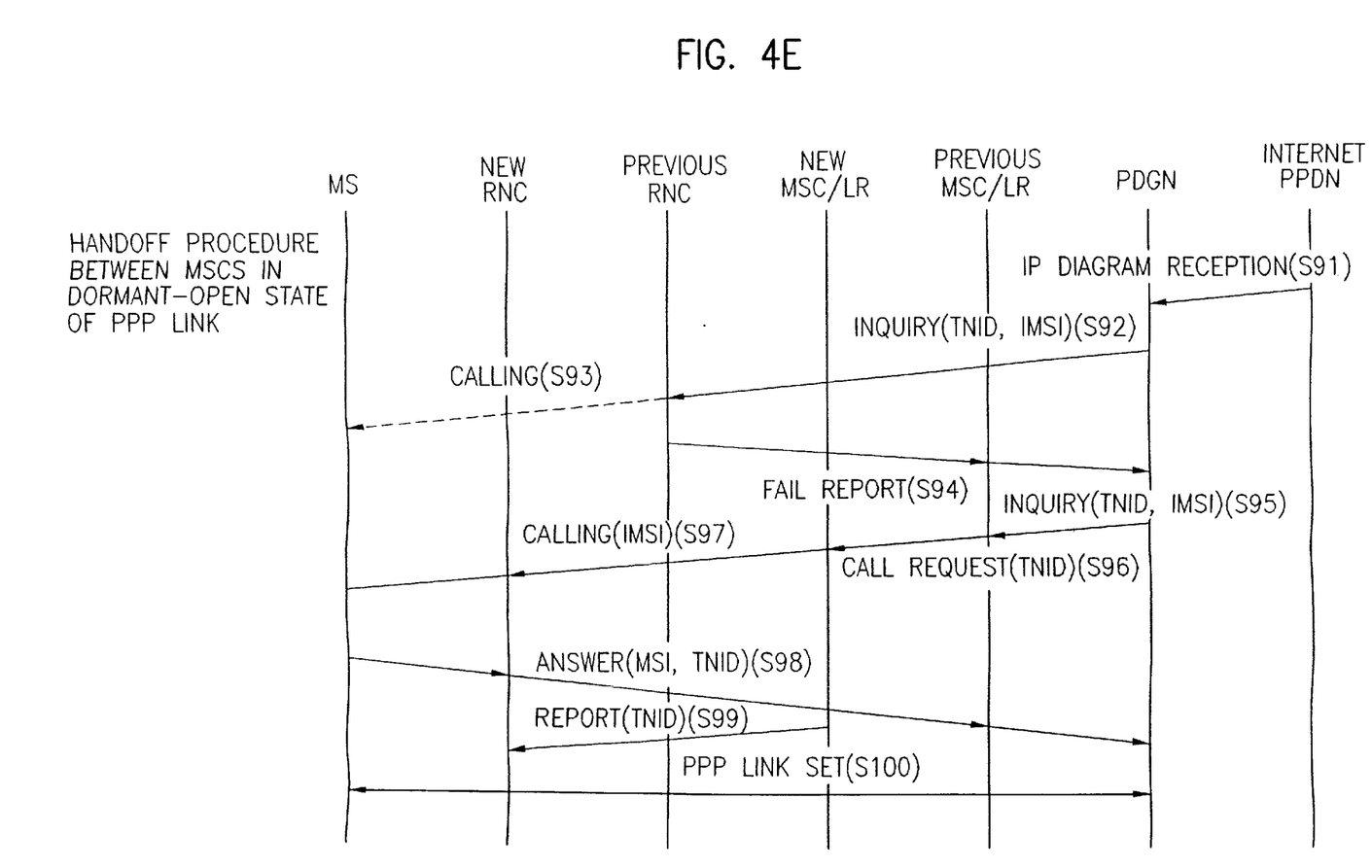

Sixth, as shown in FIG. 4e, if the IP diagram is received again to the PDGN 600 in a state that the PPP link set between the mobile station 100 or 200 and the PDGN 600 is in the dormant-open state, and a certain mobile station has moved to a new mobile switching center, the PDGN 600 inquires of the previous RNC through the previous mobile switching center about the terminating mobile station utilizing the mobile station identifier and terminal node identifier IMSI and TNID (S92) The previous RNC, if the call of the terminating mobile station fails, informs the PDGN 600 of the call failure through the previous mobile switching center (S94). Then the PDGN 600 inquires of the previous mobile switching center about the terminal node identifier TNID of the new RNC (S95). The previous mobile switching center inquires of the new mobile switching center and identifies the terminal node identifier TNID (S96) Thereafter, the new mobile switching center 500 calls the terminating mobile station through the new RNC (S97). Accordingly, the new RNC can call the terminating mobile station, and thus the terminating mobile station informs the PDGN 600 of an answer message through the new RNC, the new mobile switching center, and the previous mobile switching center (S98). Also, the new mobile switching center reports the terminal node identifier TNID of the PDGN 600 to the new RNC (S99).

Accordingly, the PPP link is set between the PDGN 600 and the terminating mobile station using the virtual network pipeline, and thus the upper layer packet data can be transmitted (S100).

As described above, the radio packet data terminal and the method of determining an Internet interworking protocol (IP) address according to the present invention can provide the Internet protocol option, connection address option, and state option of the packet data link when the packet data service is requested, and thus the packet connection link for the packet data service initially connected can be maintained by requesting the packet service even if a handoff is generated by the movement of the corresponding mobile terminal in the mobile radio communication system which provides the radio packet data service.

Also, the radio packet data terminal and the method of determining an Internet interworking protocol (IP) address according to the present invention can connect to the terminal of the MIP option and to the terminal of the UIP option the Internet protocol data program for reaching their own Internet protocol addresses regardless of their location in the communication network, and thus all the elements of the mobile radio communication network can effectively determine the packet data paths.

Consequently, since the radio packet data terminal and the method of determining an Internet interworking protocol (IP) address according to the present invention can determine various packet data paths in accordance with the specification of the terminal of the corresponding option, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method of determining Internet interworking protocol address, comprising:
   transmitting mobile station packet calls from a mobile terminal of a mobile station to a radio network controller in a radio packet data network and registering as a packet data service option of the mobile terminal one of a simple interworking protocol (SIP) option, a mobile interworking protocol (MIP) option, and a unique interworking protocol (UIP) option in accordance with a response to the transmitted mobile station packet calls;
   establishing a point-to-point (PPP) link by calling data service packets in accordance with the option registered in the mobile terminal after the registration of the packet data service option and releasing a packet channel of the mobile terminal if a term of a PPP link timer of the radio network controller expires and a present state is a dormant-open state; and
   re-establishing the established PPP link by re-transmitting the mobile station packet calls to a new radio network controller and transmitting upper layer data on a virtual network pipeline (VNP) if a handoff is generated between the mobile station and the new radio network controller in the dormant-open state of the PPP link.

2. The method of determining an Internet interworking protocol address as claimed in claim 1, further comprising additionally registering a default access option and a designated access option on the mobile station in accordance with a service call option at the packet data service option registering step.

3. The method of determining an Internet interworking protocol address as claimed in claim 1, wherein the simple interworking protocol (SIP) option is used when the mobile station does not have its own Internet interworking protocol address.

4. The method of determining an Internet interworking protocol address as claimed in claim 1, wherein the mobile interworking protocol (MIP) option used when an internet protocol address of a temporality fixed Internet is used between a mobile terminal and a data terminal of the mobile station.

5. The method of determining an Internet interworking protocol address as claimed in claim 1, wherein the unique interworking protocol (UIP) option is an option which is registered in connection with a mobile station identifier or an international mobile station identifier (IMSI), and which is applied when an Internet address connected to and secured by a packet data gateway node (PDGN) is permanently given to and used by the mobile terminal.

6. A radio packet data terminal, comprising:
- a first mobile terminal determined by a simple interworking protocol (SIP) option to provide a mobile data service only to a network interworking protocol (IP) after connecting with Internet if the radio packet data terminal does not have a fixed IP address;
- a second mobile terminal determined by a mobile interworking protocol (MIP) option to provide the mobile data service to a radio LAN port including a home agent and a foreign agent if the radio packet data terminal has the fixed IP address or is connected to a personal computer (PC); and
- a third mobile terminal determined by a unique interworking protocol (UIP) option to provide the mobile data service to its own interworking function device if the radio packet data terminal is permanently provided with an Internet interworking protocol.

7. The radio packet data terminal as claimed in claim 6, wherein the first, second and third mobile terminals operate in one of an active open state, a dormant open state, and a close state in accordance with a connection state of a packet data link.

8. The radio packet data terminal as claimed in claim 6, wherein the first, second and third mobile terminals selectively designate a packet data interworking function device to be connected thereto when a user of the radio packet data terminal requests a packet data service.

9. The radio packet data terminal as claimed in claim 6, wherein the first, second and third mobile terminal classify a connection request into a new packet data service connection request and a re-connection request after a dormant state and transmit different messages when they transmit an originating message to a base station to which they belong.

10. The radio packet data terminal as claimed in claim 6, wherein when the first, second and third mobile terminals request a packet data service connection again after a dormant state, they are differently connected to the packet data service network in accordance with a connection state of a packet data point-to-point (PPP) link by classifying the connection state into a state that the corresponding mobile terminal has connected to the same packet interworking function device that maintains the PPP link state of the corresponding mobile terminal, and a state that the corresponding mobile terminal has moved and connected to a different packet data interworking function device.

11. The radio packet data terminal as claimed in claim 6, wherein when the second mobile terminal requests a packet data service connection for designating a packet data interworking function device, the second mobile terminal transmits a request message for a mobile Internet protocol (MIP) service registration to a base station to which it belongs.

12. The radio packet data terminal as claimed in claim 6, wherein if the second mobile terminal is in an active state, it requests to a mobile switching center a mobile Internet protocol (MIP) service registration even without a user's request when a power of the second mobile terminal is on or re-registration of the MIP option is required.

13. A method of determining an Internet interworking protocol address, comprising:
- establishing a mobile station packet call between a mobile terminal of a mobile station and a first radio network controller in a radio packet data network and registering a packet data service option of the mobile terminal;
- establishing a point-to-point (PPP) link by calling data service packets in accordance with the registered service option and releasing the PPP link at a prescribed time; and
- re-establishing the PPP link by re-transmitting mobile station packet call to a second radio network controller and transmitting upper layer data on a virtual network pipeline (VNP) if the mobile packet call is handed off to the second radio network controller while the PPP link is in a dormant-open state, wherein the packet data service option is one of a simple interworking protocol (SIP) option, a mobile interworking protocol (MIP) option, and a unique interworking protocol (UIP) option, and is registered in accordance with a response to the established mobile station packet call.

14. The method of claim 13, wherein the SIP option is used when the mobile station does not have an Internet interworking protocol address.

15. The method of claim 13, wherein the MIP option used when an internet protocol address of a temporality fixed Internet is used between the mobile terminal and a data terminal.

16. The method of claim 13, wherein the UIP option is used when an Internet address connected to and secured by a packet data gateway node (PDGN) is permanently given to and used by the mobile terminal.

17. The method of claim 16, wherein the UIP is an option which is registered in connection with a mobile station identifier or an international mobile station identifier (IMSI).

18. The method of claim 13, further comprising releasing the PPP link of the mobile terminal if a term of a PPP link timer of a radio network controller expires while in a dormant-open state.

* * * * *